No. 729,547. PATENTED JUNE 2, 1903.
J. L. CLARK.
TOASTER.
APPLICATION FILED SEPT. 29, 1902.
NO MODEL.

Witnesses:
E. Behel.
H. J. Slagle

Inventor:
John L. Clark
By A. O. Behel
Atty.

No. 729,547. Patented June 2, 1903.

UNITED STATES PATENT OFFICE.

JOHN L. CLARK, OF ROCKFORD, ILLINOIS.

TOASTER.

SPECIFICATION forming part of Letters Patent No. 729,547, dated June 2, 1903.

Application filed September 29, 1902. Serial No. 125,313. (No model.)

*To all whom it may concern:*

Be it known that I, JOHN L. CLARK, a citizen of the United States, residing at Rockford, in the county of Winnebago and State of Illinois, have invented certain new and useful Improvements in Toasters, of which the following is a specification.

The object of this invention is to construct a toaster composed of a base-plate supporting a series of wires which hold the bread to be toasted free of the base-plate, which prevents the bread from burning.

Figure 1:
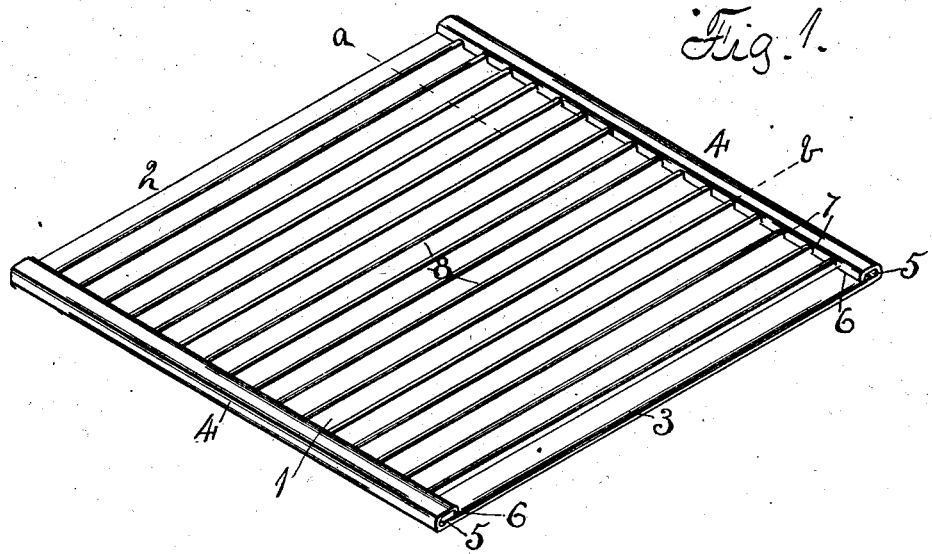
Figure 2:
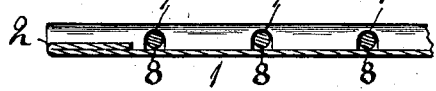
Figure 3:

In the accompanying drawings, Figure 1 is an isometrical representation of my improved toaster. Fig. 2 is a section on dotted line $a$, Fig. 1. Fig. 3 is a section on dotted line $b$, Fig. 1.

The base-plate 1 has its edges 2 and 3 turned over upon the plate, and the ends 4 are also turned over in a manner to leave a space 5. The inner edges 6 of the ends are provided with a series of notches 7. Wires 8 are located over the face of the base-plate, their ends being held in the notches 7.

In the manufacture of the toaster the wires are located on the face of the base-plate and the ends of the base-plate are turned over the ends of the wires. By thus constructing the toaster a single operation is required to secure all the wires in place.

By supporting the wires over the base-plate the bread to be toasted is held free of the base-plate and will not be burned, but an even toast will be given the bread.

I claim as my invention—

A toaster comprising a sheet-metal base having inturned ends, the lower edges of the inturned ends provided with notches, and wires located over the base, and the ends located in the notches.

JOHN L. CLARK.

Witnesses:
 A. O. BEHEL,
 E. BEHEL.